US012570547B1

(12) United States Patent
Abdulkhair et al.

(10) Patent No.: US 12,570,547 B1
(45) Date of Patent: *Mar. 10, 2026

(54) COPPER HYDROXIDE NITRATE/CALCIUM SILICATE/GRAPHITIC CARBON NITRIDE NANOCOMPOSITE MATERIAL BASED ABSORBENT FOR WASTEWATER TREATMENT

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/256,982

(22) Filed: Jul. 1, 2025

(51) Int. Cl.
| | |
|---|---|
| C02F 1/28 | (2023.01) |
| B01J 20/02 | (2006.01) |
| B01J 21/16 | (2006.01) |
| B01J 27/25 | (2006.01) |
| B01J 35/30 | (2024.01) |
| B01J 35/45 | (2024.01) |
| B01J 35/61 | (2024.01) |
| B01J 35/63 | (2024.01) |

(Continued)

(52) U.S. Cl.
CPC .......... *C02F 1/288* (2013.01); *B01J 20/0237* (2013.01); *B01J 21/16* (2013.01); *B01J 27/25* (2013.01); *B01J 35/393* (2024.01); *B01J 35/45* (2024.01); *B01J 35/615* (2024.01);

*B01J 35/633* (2024.01); *B01J 35/647* (2024.01); *B01J 37/08* (2013.01); *B01J 37/343* (2013.01); *B01J 37/346* (2013.01); *C02F 1/281* (2013.01); *B01J 2220/42* (2013.01); *C02F 2101/30* (2013.01); *C02F 2305/08* (2013.01)

(58) Field of Classification Search
None
See application file for complete search history.

(56) References Cited

U.S. PATENT DOCUMENTS

2017/0334746 A1    11/2017   Patwardhan et al.

FOREIGN PATENT DOCUMENTS

| | | | |
|---|---|---|---|
| CN | 108693927 A | 5/2017 | |
| CN | 112169750 B  * | 4/2024 | .............. B01J 20/04 |

OTHER PUBLICATIONS

Cao et al ("Hierarchical hollow copper hydroxide nitrate derived from ZIF-67 for efficiency adsorption of tetracycline and methyl orange", J Molecular Liquids, vol. 408, (2024), 125322, pp. 1-9) (Year: 2024).*

(Continued)

*Primary Examiner* — Michael Forrest
(74) *Attorney, Agent, or Firm* — Oblon, McClelland, Maier & Neustadt, L.L.P.

(57) ABSTRACT

A method of absorption includes contacting a copper hydroxide nitrate/calcium silicate/graphite-phase carbon nitride [$Cu_2(OH)_3NO_3/CaSiO_3@$-$C_3N_4$] nanocomposite catalyst with a solution including one or more pollutants. Further, the method includes absorbing the one or more pollutants on the $Cu_2(OH)_3NO_3/CaSiO_3@$-$C_3N_4$ nanocomposite catalyst.

19 Claims, 8 Drawing Sheets

Contact a $Cu_2(OH)_3NO_3/CaSiO_3@$g-$C_3N_4$ nanocomposite catalyst with a solution including one or more pollutants — 92

Absorb the one or more pollutants on the $Cu_2(OH)_3NO_3/CaSiO_3@$g-$C_3N_4$ nanocomposite catalyst — 94

— 90

(51) Int. Cl.
    *B01J 35/64*       (2024.01)
    *B01J 37/08*       (2006.01)
    *B01J 37/34*       (2006.01)
    *C02F 101/30*     (2006.01)

(56)           References Cited

OTHER PUBLICATIONS

Yao et al ("Synthesis and enhanced visible-light photocatalytic activity of wollastonite/g-C3N4 composite", Materials Research Bulletin, 86 (2017) 186-193) (Year: 2017).*
Yong Cao, et al., "Hierarchical hollow copper hydroxide nitrate derived from ZIF-67 for efficiency adsorption of tetracycline and methyl orange", Journal of Molecular Liquids, vol. 408, Aug. 15, 2024, 125322, 9 pages.
Guangyuan Yao, et al., "Synthesis and enhanced visible-light photocatalytic activity of wollastonite/g-C3N4 composite" Materials Research Bulletin, vol. 86, Feb. 2017. pp. 186-193, 8 Pages.

* cited by examiner 200 nm

COPPER HYDROXIDE NITRATE/CALCIUM SILICATE/GRAPHITIC CARBON NITRIDE NANOCOMPOSITE MATERIAL BASED ABSORBENT FOR WASTEWATER TREATMENT

BACKGROUND

Technical Field

The present disclosure is related to a method of absorbing one or more pollutants in wastewater by a copper hydroxide nitrate/calcium silicate/graphitic carbon nitride ($Cu_2(OH)_3NO_3/CaSiO_3@g-C_3N_4$) nanocomposite-base absorbent. The present disclosure is also related to a process of producing such nanocomposite-based absorbent containing copper hydroxide nitrate ($Cu_2(OH)_3NO_3$), calcium silicate ($CaSiO_3$) and a graphite-phase carbon nitride ($g-C_3N_4$).

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Both organic and inorganic contaminants have the potential to have catastrophic consequences and seriously damage environmental systems. In particular, contamination from heavy metal ions that currently plagued the globe are very toxic, carcinogenic, and non-biodegradable. The manufacturing of chemicals, textiles, leather, plastics, mining, batteries, paint & pigments, paper, and pulp are examples of human-induced activities that contribute to heavy metal pollution. The biota is threatened by the untreated discharge of these hazardous metals into streams and effluents. They may enter living things through food chains and have the potential to cause major illnesses like cancer, harm to the nervous system, and kidney failures. At high concentrations, they may even be lethal. Many procedures, such as membrane filtration, ion exchange, coagulation, precipitation, reverse osmosis, and adsorption approaches, have been developed in the search for a remediation process to remove such heavy metal ions. Because of their exceptional exclusion capabilities at trace levels, as well as their affordability and ease of use in comparison to traditional procedures, adsorption methods are highly preferred among these approaches. The most prevalent ionic heavy metals found in industrial water runoff include elements like cadmium (Cd), chromium (Cr), copper (Cu), iron (Fe), lead (Pb), nickel (Ni), argenteum (Ag), zinc (Zn), and uranium (U), where copper typically is present at a significant concentration since copper is the most prized and widely used metal in many engineering applications, such as metal polishing, electroplating and etching.

As a cost-effective metal-free n-type semiconductor that is chemically and thermally stable, visible light responsive, innocuous, and simple to manufacture, graphite-phase carbon nitride ($g-C_3N_4$) has garnered a lot of attention lately [See: Singh, D., et al. (2014) "Citric acid coated magnetic nanoparticles: synthesis, characterization and application in removal of Cd (II) ions from aqueous solution", *Journal of Water Process Engineering*, 4: p. 233-241]. However, graphite-phase carbon nitride ($g-C_3N_4$) has its own disadvantages including poor specific surface area, rapid electron-hole pair recombination, and challenging exfoliation. Heteroatom doping and changes to the microstructure design are used to get around these drawbacks, where adding metal nanoparticles to $g-C_3N_4$ nanosheets may prevent nanosheets from wrapping, maintaining a large specific surface area and increased adsorption capacity. Several modified graphite-phase carbon nitride ($g-C_3N_4$) has been developed to exclude copper ions including magnesium yttrium oxide-graphitic carbon nitride composite ($MgY_2O_4-g-C_3N_4$), oxidized graphitic carbon nitride/polyaniline nanofibers composite ($Ox-g-C_3N_4/Pani-NF$), and cobalt ferrite-graphitic carbon nitride composite ($CoFe_2O_4-g-C_3N_4$), while other modified graphite-phase carbon nitride ($g-C_3N_4$) has been developed to exclude cadmium ions including cadmium sulfide/graphitic carbon nitride composite ($CdS/gC_3N_4$, $Y_2O_3@g-C_3N_4$) and zinc oxide-graphitic carbon nitride composite ($ZnO-g-C_3N_4$). Several studies have described metal oxides as improving pore volume and average pore size [See: Sharma, D., et al. (2022) "In-situ synthesis of ZnO modified $gC_3N_4$ composite: a potential photocatalyst and adsorbent for waste water remediation", *Materials research innovations*, 26 (2): p. 65-75 and Li, D., et al. (2021) "Electrochemical hydrogen evolution reaction efficiently catalyzed by Ru—N coupling in defect-rich $Ru/gC_3N_4$ nanosheets", *Journal of Materials Chemistry A*, 9 (26): p. 15019-15026

However, incorporating metal particles into $g-C_3N_4$ nanocomposites may introduce several drawbacks. The metal particles may lead to agglomeration, reducing the surface area and catalytic efficiency. While metals may improve charge separation, they may also increase the risk of charge recombination if they are not properly dispersed. The interaction between metal particles and $g-C_3N_4$ may sometimes be unstable, leading to degradation under harsh conditions. Additionally, the synthesis of metal-$g-C_3N_4$ composites may be complex and costly, and the leaching of metals into the environment may pose toxicity risks.

Carbon based nanoparticles, on the contrary, have several benefits. The highly specialized surface area improves the active area required for different applications and permits further contact with the electrolyte. Additionally, carbon based nanoparticles are electrically conductive, which is essential for effective charge and discharge procedures [See: Ibrahim, T. G., et al. (2024) "Eliminating Manifold Pharmaceutical Pollutants with Carbon Nanoparticles Driven via a Short-Duration Ball-Milling Process", *Surfaces*, 7 (3): p. 493-507.]. The performance of carbon nanomaterials may be improved by further rapidly loading with electrochemically active species. They are also chemically stable. In addition, they are economically friendly and ecologically sustainable. Additionally, the energy density and rate performance of the supercapacitor may be enhanced by including carbon nanomaterials into composites or by combining them with other materials like metal sheets or graphene [See: Khairy, M, et al. (2024) "Enhancing the Conductivity and Dielectric Characteristics of Bismuth Oxyiodide via Activated Carbon Doping", *Molecules*, 29 (9): p. 2082.]. Because of the special qualities and adaptability, carbon nanomaterials present a viable option for high-performance supercapacitors.

When it comes to supercapacitors, $g-C_3N_4$ has several benefits over activated carbon. First of all, on the contrary to the fact that activated carbon becomes inactive under visible light, $g-C_3N_4$ is an active photocatalyst. This means that $g-C_3N_4$ may use solar energy to store charge, making it a sustainable and renewable energy source. Furthermore, $g-C_3N_4$ may absorb a wider spectrum of light wavelengths than activated carbon due to its lower bandgap, especially for visible light, which enhances supercapacitor performance and energy conversion efficiency. Additionally, by using carbon-defect and two-dimensional engineering, g-$C_3N_4$ may be readily altered and customized to improve its structural characteristics and decrease thickness. These modifications increase surface area and porosity, which are beneficial for charge storage in supercapacitors. Overall, g-$C_3N_4$ offers superior photoactivity, a more comprehensive light absorption range, and enhanced structural properties than activated carbon, making it a promising material for photocatalysis applications.

However, using carbon-based materials in g-$C_3N_4$ nanocomposites may have some drawbacks. The introduction of carbon may enhance conductivity and improve photocatalytic performance, but it may also lead to the formation of defects or reduced stability in certain environments. The dispersion of carbon materials may be challenging, leading to poor uniformity and decreased effectiveness. Additionally, carbon-based composites may face issues with charge recombination if not properly engineered. Long-term stability and potential environmental concerns, such as the leaching of carbon components, may also limit the practical applications.

Each of the aforementioned materials suffers from one or more drawbacks hindering their adoption. Accordingly, one object of the present disclosure to provide nanocomposite material for contaminant removal from aqueous stream that may circumvent the drawbacks, such as high energy consumption, high investment, high-cost factor, of the materials known in the art.

SUMMARY

One aspect of the present disclosure is a method of absorbing one or more pollutants in wastewater. The method may include contacting a copper hydroxide nitrate/calcium silicate/graphite-phase carbon nitride [$Cu_2(OH)_3NO_3$/ $CaSiO_3@g$-$C_3N_4$] nanocomposite-based absorbent with a solution including the one or more pollutants. Further, the method may include absorbing the one or more pollutants on the $Cu_2(OH)_3NO_3$/$CaSiO_3@g$-$C_3N_4$ nanocomposite-based absorbent.

In a further embodiment, the $Cu_2(OH)_3NO_3$/$CaSiO_3@g$-$C_3N_4$ nanocomposite-based absorbent may include a g-$C_3N_4$, a ($Cu_2(OH)_3NO_3$) and a $CaSiO_3$.

In a further embodiment, the one or more pollutants may be an organic pollutant.

In a further embodiment, an absorption rate of the one or more pollutants onto the $Cu_2(OH)_3NO_3$/$CaSiO_3@g$-$C_3N_4$ nanocomposite-based absorbent may follow a pseudo-first order kinetic model.

In a further embodiment, the $Cu_2(OH)_3NO_3$/$CaSiO_3@g$-$C_3N_4$ nanocomposite-based absorbent may exhibit a certain absorption capacity of the one or more pollutants.

In a further embodiment, contacting may occur for a sufficient amount of time.

In a further embodiment, the $Cu_2(OH)_3NO_3$/$CaSiO_3@g$-$C_3N_4$ nanocomposite-based absorbent may be made by a process including fabricating a calcium silicate $CaSiO_3$. The process may further include fabricating a graphite-phase carbon nitride g-$C_3N_4$. The process may further include mixing the calcium silicate $CaSiO_3$, the graphite-phase carbon nitride g-$C_3N_4$, and a copper salt in ethylene glycol monomethyl ether to form a mixture. The method may further include microwaving the mixture to form the $Cu_2$ $(OH)_3NO_3$/$CaSiO_3@g$-$C_3N_4$ nanocomposite-based absorbent.

In a further embodiment, the fabricating of the calcium silicate $CaSiO_3$ may include sonicating a mixture of a calcium salt and a silicate salt in an aqueous alcohol solution to form a calcium silicate mixture, followed by heating the calcium silicate mixture to an elevated temperature for a sufficient amount of time to form the calcium silicate $CaSiO_3$. The calcium salt may be selected from a group including calcium nitrate, calcium chloride, calcium phosphate, calcium carbonate and calcium citrate, and the silicate salt may be selected from the group including calcium silicate, sodium silicate, potassium silicate, zeolites and micas.

In a further embodiment, the fabricating of the graphite-phase carbon nitride g-$C_3N_4$ may comprise heating urea to an elevated temperature for a sufficient amount of time.

In a further embodiment, the mixing may include a copper salt selected from the group including copper nitrate, copper chloride, copper sulfate, copper bromide and copper cyanide.

In a further embodiment, the microwaving may be performed at an elevated temperature under a certain pressure for a sufficient amount of time.

Another aspect of the present disclosure is a $Cu_2$ $(OH)_3NO_3$/$CaSiO_3@g$-$C_3N_4$ nanocomposite. The $Cu_2$ $(OH)_3NO_3$/$CaSiO_3@g$-$C_3N_4$ nanocomposite may include metal oxide nanorods and g-$C_3N_4$ nanosheets, where the metal oxide nanorods may include $Cu_2(OH)_3NO_3$ and $CaSiO_3$.

In a further embodiment, the metal oxides nanorods of the $Cu_2(OH)_3NO_3$/$CaSiO_3@g$-$C_3N_4$ nanocomposite may have a certain average length at a micrometer scale.

In a further embodiment, the metal oxides nanorods of the $Cu_2(OH)_3NO_3$/$CaSiO_3@g$-$C_3N_4$ nanocomposite may include nanowires at a length of a nanometer scale where the nanowires may protrude perpendicularly to the nanorods.

In a further embodiment, the metal oxides nanorods of the $Cu_2(OH)_3NO_3$/$CaSiO_3@g$-$C_3N_4$ nanocomposite may be dispersed on the g-$C_3N_4$ nanosheets with some aggregates.

In a further embodiment, the $Cu_2(OH)_3NO_3$/$CaSiO_3@g$-$C_3N_4$ nanocomposite may have a mesoporous structure with a plurality of wide pores in the g-$C_3N_4$ nanosheets where the metal oxides nanorods deposit.

In a further embodiment, the $Cu_2(OH)_3NO_3$/$CaSiO_3@g$-$C_3N_4$ nanocomposite may have a certain pore diameter at a nanometer scale.

In a further embodiment, the $Cu_2(OH)_3NO_3$/$CaSiO_3@g$-$C_3N_4$ nanocomposite may exhibit a certain Brunauer-Emmett-Teller (BET) surface area.

In a further embodiment, the $Cu_2(OH)_3NO_3$/$CaSiO_3@g$-$C_3N_4$ nanocomposite may have a certain average pore volume.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof may be readily obtained as the same becomes better understood by reference to the following detailed description when considered in connection with the accompanying drawings, wherein.

DETAILED DESCRIPTION

Figure 1A:
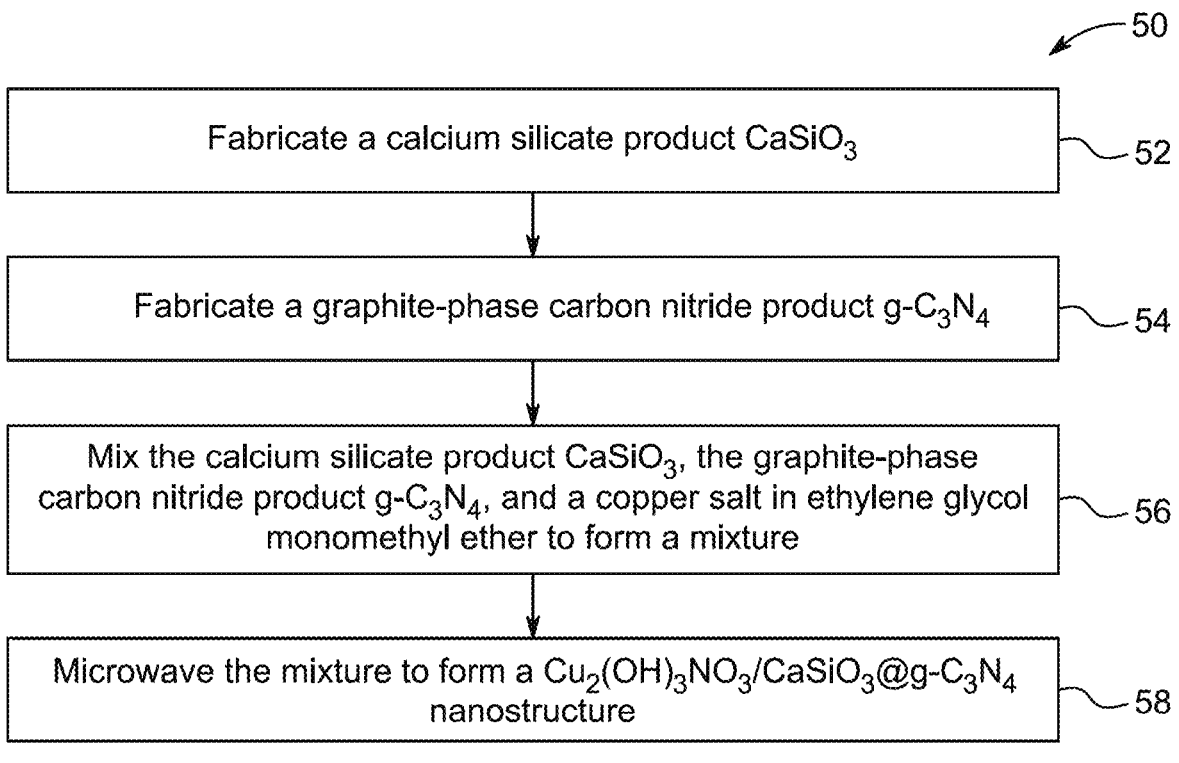
FIG. 1A is a schematic diagram of a flowchart depicting a process to fabricate a copper hydroxide nitrate/calcium silicate/graphite-phase carbon nitride ($Cu_2(OH)_3NO_3$/$CaSiO_3@g-C_3N_4$) nanocomposite-based absorbent, according to certain embodiments.

Embodiments of the present invention will now be described fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a', 'an' and the like generally carry a meaning of 'one or more,' unless stated otherwise.

When describing the present disclosure, the terms used are to be construed in accordance with the following definitions, unless a context dictates otherwise.

Furthermore, the terms 'approximately', approximate', 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'particle' refers to a small object that acts as a whole unit with regard to its transport and properties.

As used herein, the term 'nanocomposite' refers to a composite material in which at least one dimension of the component is in the nanometer size scale (<100 nm). The nanocomposite is a polyphase solid material made up of two or more nanomaterials. The term includes all types of multiphase solid materials in which one of the phases has one, two, or three dimensions of less than 100 nm, or structures having nanoscale repeat distances between the different phases that make up the material. The definition within the scope of the invention includes porous media, colloids, gels, copolymers, and solid combination of a bulk matrix and nano dimensional phase(s) differing in properties due to dissimilarities in structure and chemistry. Morphologies of the nanocomposite generally include phase separated systems, intercalated systems, and exfoliated systems. The nanocomposite includes ceramic matrix nanocomposites (CMNC), polymer matrix nanocomposites (PMNC), metal matrix nanocomposites (MMNC) or any combination thereof.

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

As used herein the term 'disposed' refers to being positioned, placed, deposited, arranged or distributed in a particular manner.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially crystalline materials.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present disclosure, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers.

Aspects of this disclosure pertain to a nanocomposite material of $Cu_2(OH)_3NO_3/CaSiO_3@g-C_3N_4$ nanocomposite-based absorbent fabricated for effective pollutant adsorption for wastewater remediation.

A nanocomposite-based absorbent is described. The nanocomposite-based absorbent includes a graphite-phase carbon nitride (g-$C_3N_4$), a copper hydroxide nitrate ($Cu_2(OH)_3NO_3$), and a calcium silicate ($CaSiO_3$). In some embodiments, the nanocomposite-based absorbent may include crystalline phases, but is not limited to quartz, calcite, hematite, magnetite, goethite, dolomite, albite, anorthite, pyrite, fluorite, halite, barite, apatite, rutile, and zircon. In a preferred embodiment, the nanocomposite-based absorbent includes a metallic nanosheet of $Cu_2(OH)_2NO_3$ as a major phase together with minor phases of $Cu_2O$, $CaSiO_3$, and g-$C_3N_4$. In a preferred embodiment, the nanocomposite-based absorbent includes the $CaSiO_3$ monoclinic phase.

In some embodiment, based on a total weight of the $Cu_2(OH)_3NO_3/CaSiO_3@g-C_3N_4$ nanocomposite-based absorbent, a graphite-phase carbon nitride (g-$C_3N_4$) in an amount ranging from 20 to 40 percent by weight (wt. %), preferably 22 to 40 wt. %, preferably 25 to 40 wt. %, preferably 27 to 40 wt. %, preferably 30 to 40 wt. %, preferably 32 to 40 wt. %, preferably 35 to 40 wt. %, preferably 37 to 40 wt. %. In a preferred embodiment, the graphite-phase carbon nitride g-$C_3N_4$ is in an amount of 33.33 wt. % based on a total weight of the $Cu_2(OH)_3NO_3/CaSiO_3@g-C_3N_4$ nanocomposite-based absorbent. In some embodiment, based on a total weight of the $Cu_2(OH)_3NO_3/CaSiO_3@g-C_3N_4$ nanocomposite-based absorbent, a copper hydroxide nitrate ($Cu_2(OH)_3NO_3$) in an amount ranging from 20 to 40 percent by weight (wt. %), preferably 22 to 40 wt. %, preferably 25 to 40 wt. %, preferably 27 to 40 wt. %, preferably 30 to 40 wt. %, preferably 32 to 40 wt. %, preferably 35 to 40 wt. %, preferably 37 to 40 wt. %. In a preferred embodiment, the copper hydroxide nitrate $Cu_2(OH)_3NO_3$ is in an amount of 33.33 wt. % based on a total weight of the $Cu_2(OH)_3NO_3/CaSiO_3@g-C_3N_4$ nanocomposite-based absorbent. In some embodiment, based on a total weight of the $Cu_2(OH)_3NO_3/CaSiO_3@g-C_3N_4$ nanocomposite-based absorbent, a calcium silicate ($CaSiO_3$) in an amount ranging from 20 to 40 percent by weight (wt. %), preferably 22 to 40 wt. %, preferably 25 to 40 wt. %, preferably 27 to 40 wt. %, preferably 30 to 40 wt. %, preferably 32 to 40 wt. %, preferably 35 to 40 wt. %, preferably 37 to 40 wt. %. In a preferred embodiment, the calcium silicate $CaSiO_3$ is in an amount of 33.33 wt. % based on a total weight of the $Cu_2(OH)_3NO_3/CaSiO_3@g-C_3N_4$ nanocomposite-based absorbent.

In some embodiments, the nanocomposite comprises sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof. In a preferred embodiment, a $Cu_2(OH)_3NO_3/CaSiO_3@g-C_3N_4$ nanocomposite includes a plurality of metal oxides nanorods and a plurality of g-$C_3N_4$ nanosheets, where the metal oxide nanorods incudes a $Cu_2(OH)_3NO_3$ and $CaSiO_3$. In a preferred embodiment, the metal oxides nanorods are dispersed on the g-$C_3N_4$ nanosheets with some aggregates.

In some embodiments, the metal oxides nanorods of the $Cu_2(OH)_3NO_3/CaSiO_3@g-C_3N_4$ nanocomposite have an average length ranging from 1 to 3 μm, preferably 1.2 to 3 μm, preferably 1.5 to 3 μm, preferably 2 to 3 μm, preferably 2.5 to 3 μm. In a preferred embodiment, the metal oxides nanorods of the $Cu_2(OH)_3NO_3/CaSiO_3@g-C_3N_4$ nanocomposite have an average length of 1.97 μm. In some embodiments, the metal oxides nanorods of the $Cu_2(OH)_3NO_3/CaSiO_3@g-C_3N_4$ nanocomposite include nanowires having a length of 10 to 50 nm, preferably 15 to 50 nm, preferably 20 to 50 nm, preferably 25 to 50 nm, preferably 30 to 50 nm, preferably 35 to 50 nm, preferably 40 to 50 nm, preferably 45 to 50 nm protruding perpendicularly to the nanorods.

In some embodiments, the $Cu_2(OH)_3NO_3/CaSiO_3@g-C_3N_4$ nanocomposite is porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In a preferred embodiment, the $Cu_2(OH)_3NO_3/CaSiO_3@g-C_3N_4$ nanocomposite have a mesoporous structure with a plurality of wide pores in the g-$C_3N_4$ nanosheets where the metal oxides nanorods deposit.

In some embodiments, the $Cu_2(OH)_3NO_3/CaSiO_3@g-C_3N_4$ nanocomposite may have a Brunauer-Emmett-Teller (BET) surface area ranging from 140 to 160 $m^2 \cdot g^{-1}$, preferably 142 to 160 $m^2 \cdot g^{-1}$, preferably 145 to 160 $m^2 \cdot g^{-1}$, preferably 147 to 160 $m^2 \cdot g^{-1}$, preferably 150 to 160 $m^2 \cdot g^{-1}$, preferably 152 to 160 $m^2 \cdot g^{-1}$, preferably 155 to 160 $m^2 \cdot g^{-1}$, preferably 157 to 160 $m^2 \cdot g^{-1}$.

In a preferred embodiment, the Brunauer-Emmett-Teller (BET) surface area of the $Cu_2(OH)_3NO_3/CaSiO_3@g-C_3N_4$ nanocomposite is 149.9 $m^2 \cdot g^{-1}$. In some embodiments, the $Cu_2(OH)_3NO_3/CaSiO_3@g-C_3N_4$ nanocomposite may have an average pore diameter ranging from 3 to 7 nm, preferably 3.5 to 7 nm, preferably 4 to 7 nm, preferably 4.5 to 7 nm, preferably 5 to 7 nm, preferably 5.5 to 7 nm, preferably 6 to 7 nm, preferably 6.5 to 7 nm. In a preferred embodiment, an average pore diameter of the $Cu_2(OH)_3NO_3/CaSiO_3@g-C_3N_4$ nanocomposite is 5 nm. In some embodiments, the $Cu_2(OH)_3NO_3/CaSiO_3@g-C_3N_4$ nanocomposite may have an average pore volume of 0.3 to 0.4 $cm^3 \cdot g^{-1}$, preferably 0.32 to 0.4 $cm^3 \cdot g^{-1}$, preferably 0.34 to 0.4 $cm^3 \cdot g^{-1}$, preferably 0.36 to 0.4 $cm^3 \cdot g^{-1}$, preferably 0.38 to 0.4 $cm^3 \cdot g^{-1}$. In a preferred embodiment, an average pore volume of the $Cu_2(OH)_3NO_3/CaSiO_3@g-C_3N_4$ nanocomposite is 0.354 $cm^3 \cdot g^{-1}$. FIG. 1A illustrates a schematic flow chart of a method 50 to fabricate the $Cu_2(OH)_3NO_3/CaSiO_3@g-C_3N_4$ nanocomposite-based absorbent. The order in which the method 50 is described is not intended to be construed as a limitation, and any number of the method steps described can be combined to implement the method 50. Additionally, individual steps may be removed or skipped from the method 50 without departing from the spirit and scope of the present disclosure.

At step 52, the method 50 includes fabricating a calcium silicate $CaSiO_3$. The method of fabricating the calcium silicate $CaSiO_3$ includes sonicating a mixture of a calcium salt and a silicate salt in an aqueous alcohol solution to form a calcium silicate mixture. The method further includes heating the calcium silicate mixture to a temperature of 160 to 200° C. for 1 to 3 hours to form the calcium silicate $CaSiO_3$.

In some embodiments, the calcium salt may include calcium chloride, calcium carbonate, calcium sulfate, calcium acetate, calcium lactate, calcium phosphate, calcium gluconate, calcium citrate, calcium formate, calcium propionate, calcium stearate, calcium oxide, calcium hydroxide, calcium bicarbonate, calcium bromide, calcium iodide, calcium hypochlorite, calcium chromate, calcium tungstate, and calcium molybdate. In some embodiments, the calcium salt is selected from a group consisting of calcium nitrate, calcium chloride, calcium phosphate, calcium carbonate and calcium citrate. In a preferred embodiment, calcium salt is calcium nitrate.

In some embodiments, the silicate salt may include potassium silicate, lithium silicate, magnesium silicate, calcium silicate, aluminum silicate, barium silicate, zinc silicate, ammonium silicate, iron silicate, sodium orthosilicate, sodium disilicate, sodium hexafluorosilicate, sodium silicoaluminate, zirconium silicate, manganese silicate, strontium silicate, copper silicate, cobalt silicate, nickel silicate, and lead silicate. In some embodiments, the silicate salt is selected from a group consisting of calcium silicate, sodium silicate, potassium silicate, zeolites and micas. In a preferred embodiment, silicate salt is metasilicate.

In some embodiments, the alcohol solution may include methanol, isopropanol, butanol, tert-butanol, propanol, isobutanol, pentanol, hexanol, heptanol, octanol, benzyl alcohol, cyclohexanol, allyl alcohol, phenol, ethylene glycol, diethylene glycol, triethylene glycol, glycerol, sorbitol, and xylitol. In a preferred embodiment, alcohol solution is ethanol and water of a equimolar ratio.

In some embodiments, the calcium silicate mixture is heated to a temperature ranging from 160 to 200° C., preferably 165 to 200° C., preferably 170 to 200° C., preferably 175 to 200° C., preferably 180 to 200° C., preferably 185 to 200° C., preferably 190 to 200° C., preferably 195 to 200° C. In a preferred embodiment, the calcium silicate mixture is heated at a temperature of 180° C. In some embodiments, the calcium silicate mixture is heated for 1 to 3 hours, preferably 1.5 to 3 hours, preferably 2 to 3 hours, preferably 2.5 to 3 hours, preferably 1 to 2 hours. In a preferred embodiment, the calcium silicate mixture is heated for 2 hours.

At step 54, the method 50 includes fabricating a graphite-phase carbon nitride $g-C_3N_4$. The fabricating of the graphite-phase carbon nitride $g-C_3N_4$ includes heating urea to a temperature of 550 to 650° C. for 30 to 60 minutes.

In some embodiments, the graphite-phase carbon nitride $g-C_3N_4$ is achieved by microwave-assisted synthesis, solvothermal method, hydrothermal synthesis, chemical vapor deposition, ultrasonic exfoliation, electrochemical synthesis, plasma-enhanced chemical vapor deposition, microwave irradiation, mechanochemical synthesis, ionothermal synthesis, template-assisted synthesis, photochemical synthesis, arc-discharge method, electrospinning, wet chemical method, laser ablation, microwave-polymerization, sol-gel technique, supercritical fluid synthesis, and solution combustion synthesis. In a preferred embodiment, graphite-phase carbon nitride product is achieved by thermal condensation process. In some embodiments, the graphite-phase carbon nitride $g-C_3N_4$ is achieved by thermal condensation process by heating dicyandiamide, melamine, thiourea, cyanamide, guanidine hydrochloride, biguanide, ammonium thiocyanate, guanidine carbonate, creatinine, guanidine sulfate, ammonium cyanate, biuret, semicarbazide, hydrazine derivatives, thiobiuret, cyanoguanidine, formamidine acetate, ammonium carbamate, melam, and ammeline. In a preferred embodiment, the graphite-phase carbon nitride $g-C_3N_4$ is achieved by thermal condensation by heating urea.

In some embodiments, urea is heated to a temperature ranging from 550 to 650° C., preferably 570 to 650° C., preferably 590 to 650° C., preferably 600 to 650° C., preferably 620 to 650° C., preferably 640 to 650° C. In a preferred embodiment, urea is heated at a temperature of 600° C. In some embodiments, urea may be heated for 30-60 min, preferably 31-59 min, preferably 32-58 min, preferably 33-57 min, preferably 34-56 min, preferably 35-55 min, preferably 36-54 min, preferably 37-53 min, preferably 38-52 min, preferably 39-51 min, preferably 40-50 min, preferably 41-49 min, preferably 42-48 min, preferably 43-47 min, preferably 44-46 min. In a preferred embodiment, urea is heated at 600° C. for 45 min.

At step 56, the method 50 includes mixing the calcium silicate $CaSiO_3$, the graphite-phase carbon nitride $g-C_3N_4$, and a copper salt in ethylene glycol monomethyl ether to form a mixture.

In some embodiments, the copper salt may include, but is not limited to, copper (II) sulfate, copper (I) chloride, copper (II) chloride, copper (II) acetate, copper (I) oxide, copper (II) oxide, copper (I) bromide, copper (II) bromide, copper (I) iodide, copper (II) iodide, copper (II) carbonate, copper (II) phosphate, copper (II) fluoride, copper (II) citrate, copper (II) tartrate, copper (II) formate, copper (II) stearate, copper (II) laurate, copper (II) thiocyanate, and copper (II) arsenate. In some embodiments, the mixing includes a copper salt selected from a group consisting of copper nitrate, copper chloride, copper sulfate, copper bromide and copper cyanide. In a preferred embodiment, the copper salt is $Cu(NO_3)2.3H_2O$ In some embodiments, the ether may include diethyl ether, dimethyl ether, methyl tert-butyl ether, ethyl tert-butyl ether, diisopropyl ether, dipropyl ether, dibutyl ether, tetrahydrofuran, dioxane, anisole, ethylene glycol monoethyl ether, ethylene glycol monopropyl ether, propylene glycol monomethyl ether, propylene glycol monoethyl ether, butyl vinyl ether, phenetole, methyl phenyl ether, benzyl methyl ether, allyl phenyl ether, and tert-amyl methyl ether. In a preferred embodiment, the ether is ethylene glycol monomethyl ether.

At step 58, the method 50 includes microwaving the mixture to form the $Cu_2(OH)_3NO_3/CaSiO_3@g-C_3N_4$ nanocomposite-based absorbent. In some embodiments, the microwaving is performed at a temperature ranging from 160 to 200° C., preferably 165 to 200° C., preferably 170 to 200° C., preferably 175 to 200° C., preferably 180 to 200° C., preferably 185 to 200° C., preferably 190 to 200° C., preferably 195 to 200° C. In a preferred embodiment, the microwave temperature is 180° C. In some embodiments, the microwaving is performed at a pressure ranging from 4 to 6 bar, preferably 4.2 to 6 bar, preferably 4.5 to 6 bar, preferably 5 to 6 bar, preferably 5.2 to 6 bar, preferably 5.5 to 6 bar. In a preferred embodiment, a microwave pressure is 5 bar. In some embodiments, a microwave duration ranges from 30 to 90 minutes, preferably 30 to 90 minutes, preferably 30 to 90 minutes, preferably 30 to 90 minutes, preferably 30 to 90 minutes, preferably 30 to 90 minutes. In a preferred embodiment, a microwave duration is 60 minutes.

Figure 1B:
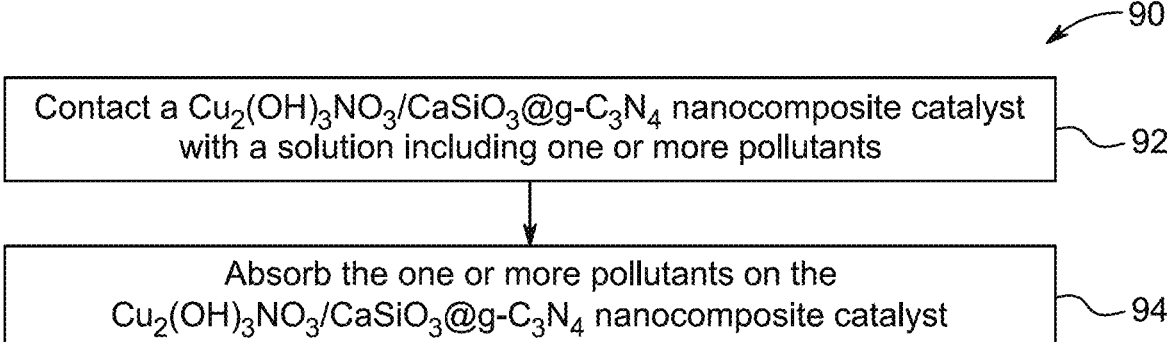
FIG. 1B is a schematic diagram of a flowchart depicting a method of absorbing one or more pollutants in wastewater, according to certain embodiments.

FIG. 1B illustrates a schematic flow chart of a method 90 of absorbing one or more pollutants in wastewater. The order in which the method 90 is described is not intended to be construed as a limitation, and any number of the described method steps can be combined to implement the method 90. Additionally, individual steps may be removed or skipped from the method 90 without departing from the spirit and scope of the present disclosure.

At step 92, the method 90 includes contacting a $Cu_2(OH)_3NO_3/CaSiO_3@g-C_3N_4$ nanocomposite-based absorbent with a solution including one or more pollutants. In some embodiments, the contacting occurs for 40 to 50 minutes, preferably 42 to 50 minutes, preferably 44 to 50 minutes, preferably 46 to 50 minutes, preferably 48 to 50 minutes.

The $Cu_2(OH)_3NO_3/CaSiO_3@g-C_3N_4$ nanocomposite-based absorbent can be used as an effective absorbent for water remediation. In some embodiments, the nanocomposite-based absorbent can be used to remove organic contaminants including pesticides, pharmaceuticals, dyes, and other synthetic or natural organic substances that can pose environmental or health risks. In some embodiments, the one or more pollutants is an organic pollutant.

In some embodiments, the organic contaminant may be a dye, a phenol, a polycyclic aromatic hydrocarbon, an herbicide, a pesticide, a persistent organic contaminant, or the like.

In alternate embodiments, the organic contaminant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-di-hydroanthraquinone, 7,14-dibenzypyrenequinone, dibro-moanthrone, 1,3-dihydroxyanthraquinone, 1,4-dihydroxy-anthraquinone, disperse red 9, disperse red 11, indanthrone blue, morindone, oil blue 35, parietin, quinizarine green SS, remazol brilliant blue R, solvent violet 13, 1,2,4-trihydroxy-anthraquinone, vat orange 1, and vat yellow 1; diaryl methane dyes such as auramine O, triarylmethane dyes such as acid fuchsin, aluminon, aniline blue WS, aurin, aurintricar-boxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FlAsH-EDT2, fluoran, fuchsine, green S, light green SF, malachite green, merbromin, metacresol purple, methyl blue, methyl violet, naphtholphthalein, new fuchsine, pararosaniline, pat-ent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resor-cinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalo-cyanine dyes such as phthalocyanine blue BN, phthalocya-nine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thio-flavin; xanthene dyes such as 6-carboxyfluorescein, eosin B, eosin Y, erythosine, fluorescein, rhodamine B, rose bengal, and Texas red; fluorone dyes such as calcein, carboxyfluo-rescein diacetate succinimidyl ester, fluo-3, fluo-4, indian yellow, merbromin, pacific blue, phloxine, and seminaph-tharhodafluor; or rhodamine dyes such as rhodamine, rho-damine 6G, rhodamine 123, rhodamine B, sulforhodamine 101, and sulforhodamine B.

A phenol is an organic compound including a hydroxyl group (—OH) bonded directly to an aromatic hydrocarbon group. Examples of phenols may include phenol (the name-sake of the group of compounds), bisphenols (including bisphenol A), butylated hydroxytoluene (BHT), 4-nonylphe-nol, orthophenyl phenol, picric acid, phenolphthalein and its derivatives mentioned above, xylenol, diethylstilbestrol, L-DOPA, propofol, butylated hydroxyanisole, 4-tert-butyl-catechol, tert-butylhydroquinone, carvacrol, chloroxyleol, cresol (including M—, O—, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-eth-ylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxyben-zone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tet-racene, chrysene, triphenylene, pyrene, pentacene, benzo[a] pyrene, corannulene, benzo[g,h,i]perylene, coronene, ova-lene, benzo[c]fluorine, acenaphthene, acenaphthylene, benz [a]anthracene, benzo[b]fluoranthene, benzo[j]fluoranthene, benzo[k]fluoranthene, benzo[e]pyrene, cyclopenta [c,d] pyrene, dibenz [a,h]anthracene, dibenzo[a,e]pyrene, dibenzo [a,h]pyrene, dibenzo[a,i]pyrene, dibenzo[a,l]pyrene, fluo-ranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapirolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

At step 94, the method 90 includes absorbing the one or more pollutants on the $Cu_2(OH)_3NO_3/CaSiO_3@g-C_3N_4$ nanocomposite-based absorbent.

In some embodiments, an adsorption rate of pollutant onto the absorbent may include, but is not limited to, pseudo-second order kinetic model, intraparticle diffusion model, Elovich model, Bangham model, Avrami kinetic model, Boyd model, film diffusion model, fractional power model, external diffusion model, and Langmuir-Hinshelwood kinetic model. In a preferred embodiment, an absorption rate of the one or more pollutants onto the $Cu_2(OH)_3NO_3/CaSiO_3@g-C_3N_4$ nanocomposite-based absorbent follows a pseudo-first order kinetic model.

In some embodiments, the $Cu_2(OH)_3NO_3/CaSiO_3@g-C_3N_4$ nanocomposite-based absorbent has an absorption capacity ranging from 100 to 115 mg of the one or more pollutants per gram, preferably 102 to 115 mg/g, preferably 104 to 115 mg/g, preferably 106 to 115 mg/g, preferably 108 to 115 mg/g, preferably 110 to 115 mg/g, preferably 112 to 115 mg/g, preferably 114 to 115 mg/g of the $Cu_2(OH)_3NO_3/CaSiO_3@g-C_3N_4$ nanocomposite-based absorbent. In a preferred embodiment, the absorption capacity is 106.9 mg/g.

The following examples are provided solely for illustration and are not to be construed as limitations of the present disclosure, as many variations thereof are possible without departing from the spirit and scope of the present disclosure.

EXAMPLES

The following examples demonstrate a method of absorption and a $Cu_2(OH)_3NO_3/CaSiO_3@g-C_3N_4$ nanocomposite. The examples are provided solely for illustration and are not to be construed as limitations of the present disclosure, as many variations thereof are possible without departing from the spirit and scope of the present disclosure.

Example 1: Fabricating Calcium Silicate ($CaSiO_3$)

According to the present disclosure, equal moles of calcium nitrate and sodium metasilicate were dispersed in 100 milliliter (mL) of ethanol:water (1:1) in a 150 ml glass beaker and sonicated for 15 minutes. The mixture was transferred to a 200 mL autoclave and then placed in an oven operated at 180 degrees Celsius (° C.) for 2.0 hour (h). The product was dispersed in 500 ml distilled water with an ultrasonic bath for 10 minutes, filtered via a buchner system, rinsed with distilled water, and dried at 120° C. for 1.0 h.

Example 2: Fabricating Graphite-Phase Carbon Nitride (g-$C_3N_4$)

About 30.0 gram (g) of urea was placed in a 250 mL porcelain crucible, covered with its porcelain cover, then the hall crucible and cover were wrapped with three layers of aluminum foil to reduce the urea loss of evaporation. The crucible was heated via a furnace set at 600° C. for 45 minutes.

Example 3: Fabricating Copper Hydroxide Nitrate/ Calcium Silicate/Graphite-Phase Carbon nitride ($Cu_2(OH)_2NO_3/CaSiO_3/g-C_3N_4$)

2.0 g of $CaSiO_3$, 2.0 g of g-$C_3N_4$ and the amount of Cu $(NO_3)$ 2.3$H_2O$ enough to produce 2.0 g of $Cu_2(OH)_2NO_3$ were transferred to a mono wave-200 vial (G30), dispersed in 20 ml ethylene glycol monomethyl ether via an ultrasonic bath for 30 minutes. The vial was closed with its teflon cover and placed in the Anton-Baar Monowave-200 operated at 180° C. and 5.0 bar pressure for one hour. The product was dispersed in 1 liter (L) distilled water with an ultrasonic bath for 30 minutes, filtered via a buchner system, rinsed with distilled water, and dried at 150° C. for 2.0 h.

Figure 2:
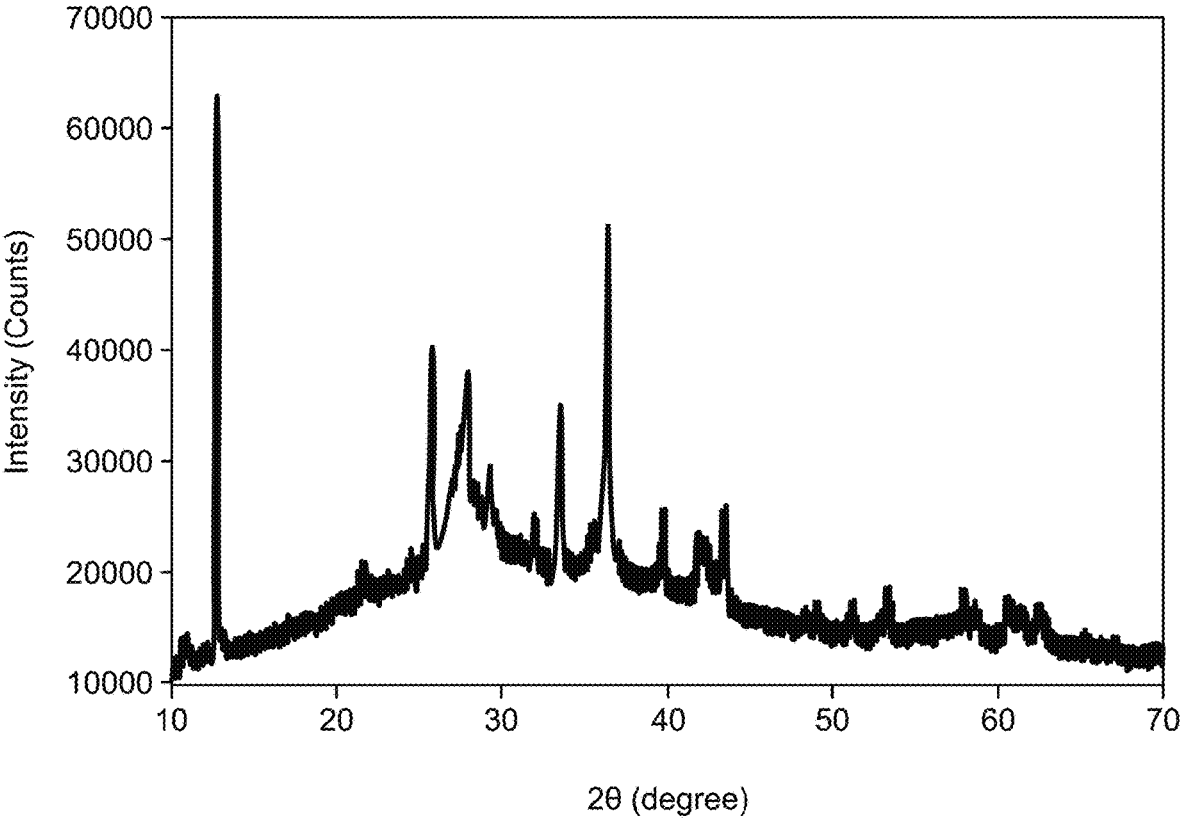
FIG. 2 depicts an X-ray diffraction (XRD) diffractogram of the $Cu_2(OH)_3NO_3$/$CaSiO_3@g-C_3N_4$ nanocomposite-based absorbent, according to certain embodiments.

The crystallinity and phases identification present in $Cu_2(OH)_2NO_3/CaSiO_3@g-C_3N_4$ nanocomposite was analyzed by XRD and the results are given in FIG. 2. The intense peaks and high intensity values indicate that the powder is highly crystalline in nature. In addition, the peak broadening indicates the small particle size of the prepared composites. Examination of the diffraction patterns with the standard JCPDS cards reveals the presence of metallic nanosheet of $Cu_2(OH)_2NO_3$ as a major phase together with minor phases of cupric oxide ($Cu_2O$), $CaSiO_3$, and g-$C_3N_4$. The $Cu_2(OH)_2NO_3$ phase was indexed to the strong reflections at $2\theta$ values of 12.9°, 25.7°, 33.8°, 36.7°, and 43.4° (JCPDS No. 00-003-0061). The $CaSiO_3$ monoclinic phase (JCPDS No. 00-001-0720) was detected at $2\theta$ values of 27.3°, 32.3° and 62.6°. The $Cu_2O$ was characterized by a strong reflection at $2\theta$ value of 36.4° (JCPDS No. 01-078-2076). The diffractions related to g-$C_3N_4$ were observed at 33.2°, and 58.0° (COD No. 1534042 and JCPDS No. 00-050-0848). The weak diffractions of both $CaSiO_3$ and g-$C_3N_4$ may be attributed to the semi-crystalline nature of these phases and the high crystalline phases of $Cu_2O$ and $Cu_2(OH)_2NO_3$ phases in the prepared composite. No other phases were detected indicating the successful fabrication of $Cu_2(OH)_2NO_3/CaSiO_3@g-C_3N_4$.

Figure 3A:
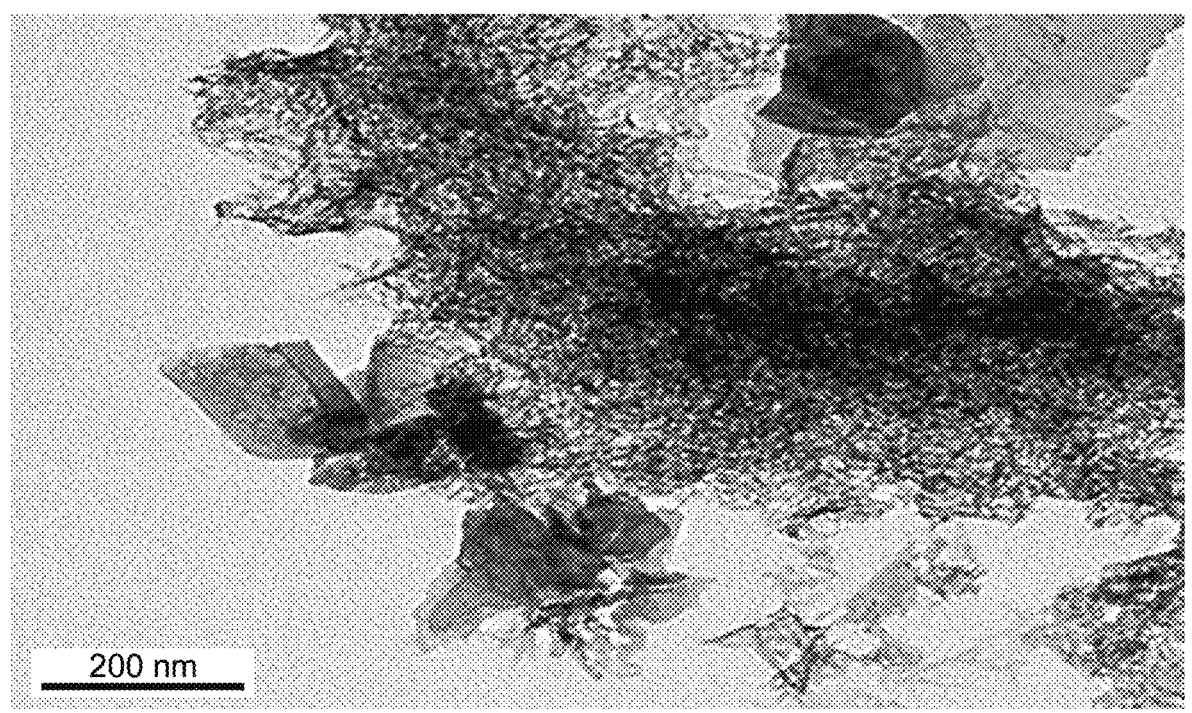
FIG. 3A depicts a transmission electron microscopy (TEM) image of the $Cu_2(OH)_3NO_3$/$CaSiO_3@g-C_3N_4$ nanocomposite-based absorbent at 200 nanometer (nm) magnification, according to certain embodiments.
Figure 3B:
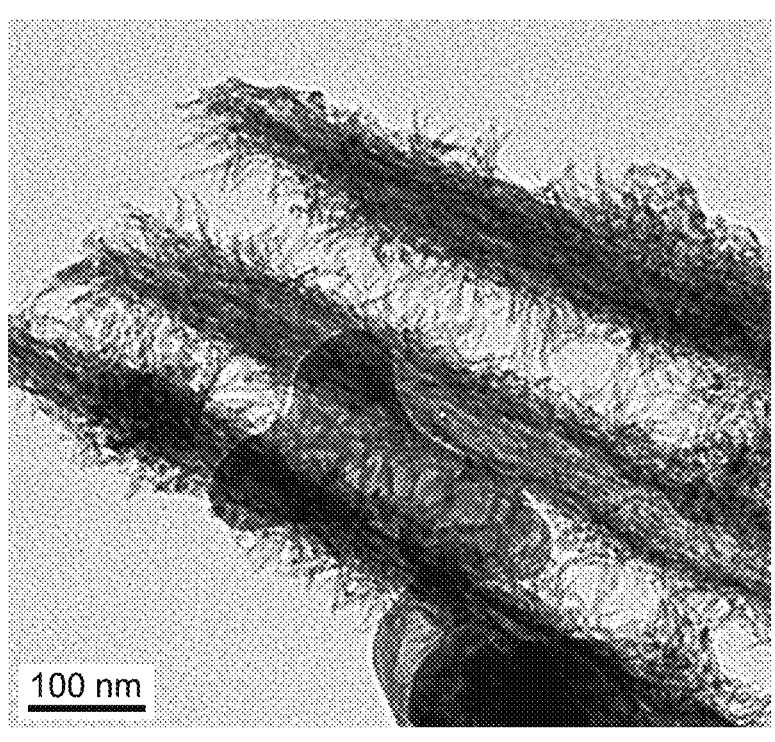
FIG. 3B depicts a TEM image of the $Cu_2(OH)_3NO_3$/$CaSiO_3@g-C_3N_4$ nanocomposite-based absorbent at 100 nm magnification, according to certain embodiments.
Figure 3C:
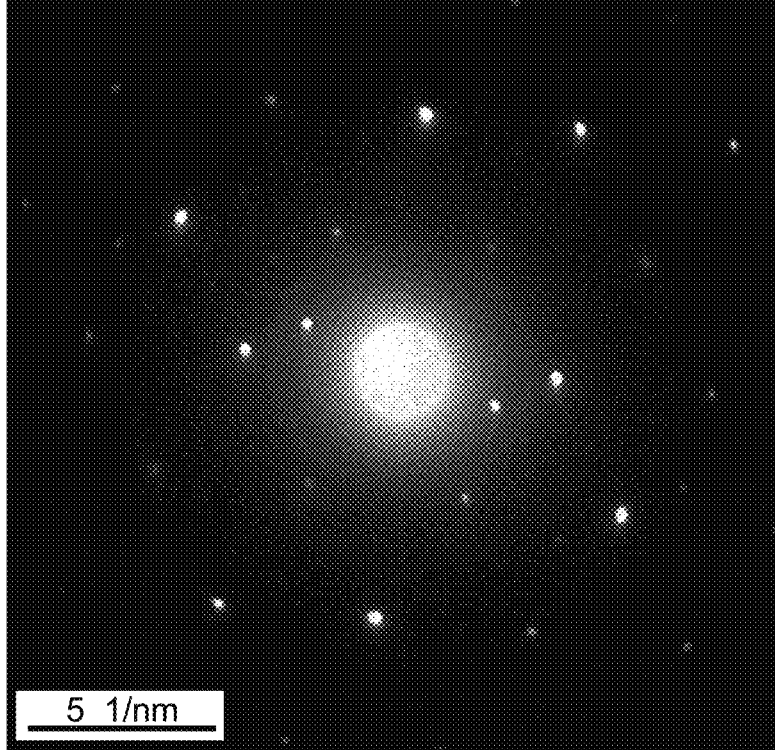
FIG. 3C depicts a selected area electron diffraction (SAED) patterns of the $Cu_2(OH)_3NO_3$/$CaSiO_3@g-C_3N_4$ nanocomposite-based absorbent, according to certain embodiments.

TEM images of $Cu_2(OH)_2NO_3/CaSiO_3/g-C_3N_4$ nanocomposite were presented in FIGS. 3A-3B. The TEM images showed that a two-dimensional porous structure constructed with curled and wrinkled nanosheets and platelets of the g-$C_3N_4$, as shown in FIG. 3A. The image also shows well dispersion of rods metal oxides nanoparticles with size 1.97 micrometer ($\mu$m) and some aggregates on nanosheets of g-$C_3N_4$. The corresponding selected area electron diffraction (SAED) pattern reveals diffraction spots with interplanar spacing of 0.365 nanometer (nm), 0.242 nm, 0.141 nm, and 0.124 nm due to ($CaSiO_3$: 2-12, $Cu_2$ ($NO_3$)($OH$)$_3$: -111), ($CaSiO_3$: -2-12, $Cu_2$($NO_3$)($OH$)$_3$: -211), ($CaSiO_3$: 322, $Cu_2$($NO_3$)($OH$)$_3$:00-5), and ($CaSiO_3$: -125) diffraction plane, as shown in FIG. 3C.

Figure 4A:
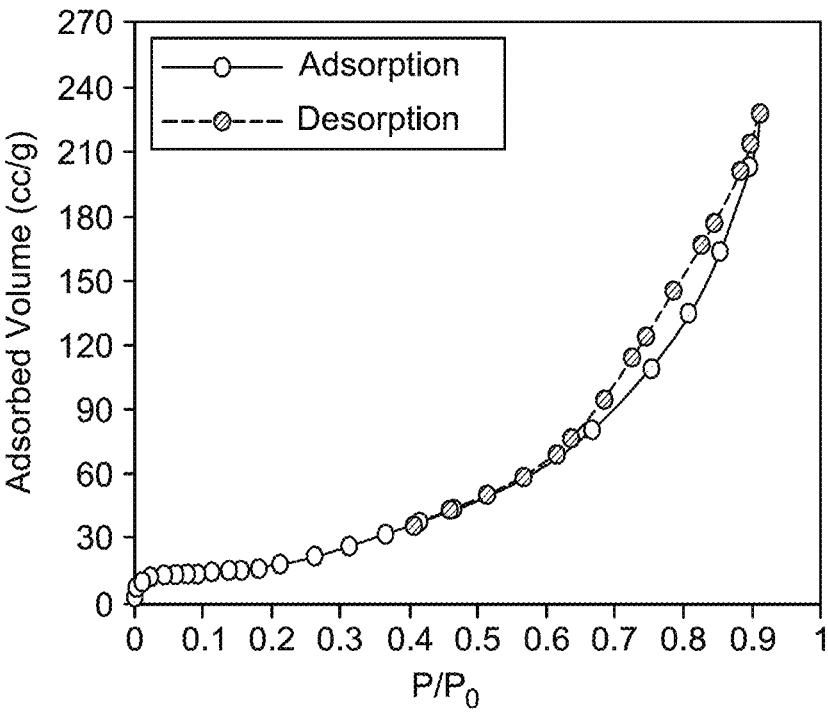
FIG. 4A is a graph depicting nitrogen ($N_2$) adsorption-desorption isotherms of the $Cu_2(OH)_3NO_3$/$CaSiO_3@g-C_3N_4$ nanocomposite-based absorbent, according to certain embodiments.
Figure 4B:
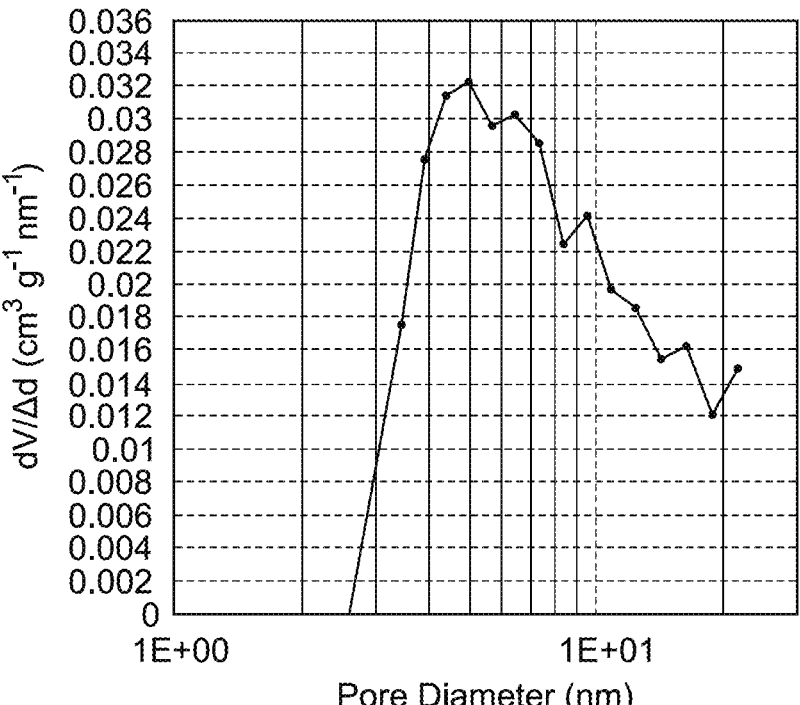
FIG. 4B is a graph depicting pore size distribution of the $Cu_2(OH)_3NO_3$/$CaSiO_3@g-C_3N_4$ nanocomposite-based absorbent, according to certain embodiments.

FIG. 4A displays the nitrogen adsorption-desorption isotherms of $Cu_2$($OH$)$_2NO_3$/$CaSiO_3$@g-$C_3N_4$ nanocomposite. The nitrogen sorption isotherm of the composite belonging to type IV with noticed hysteresis loop, indicating the formation of mesoporous structures. However, shifting the loop to a relatively higher pressure (P/$P_o$=0.62-1) suggests the presence of wide mesopores, which may result from the deposition of metal oxides particles in the wide pores of g-$C_3N_4$. Furthermore, the Brunauer-Emmett-Teller (BET) surface area of the $Cu_2$($OH$)$_2NO_3$/$CaSiO_3$@g-$C_3N_4$ sample was calculated to be 149.9 square meter per gram ($m^2$g-1). The marked high specific surface area reflects the good dispersion of these metal oxides nanoparticles on g-$C_3N_4$ and $CaSiO_3$. Moreover, the pore size distribution curves, plotted using the barrett-joyner-halenda (BJH) method, for the $Cu_2$($OH$)$_2NO_3$/$CaSiO_3$@g-$C_3N_4$ sample exhibited unimodal distribution with average pore diameters maximized at 5 nm and pore volume of 0.354 cubic centimeter per gram ($cm^3$g$^{-1}$), as shown in FIG. 4B. All the isotherms fall under the $H_3$ pore type category, which is characterized by the absence of a limiting adsorption plateau at high relative pressure (P/$P_o$). This behavior is typically associated with the aggregation of plate-like particles, resulting in the formation of slit-shaped pores. This indicates that the assembly of $Cu_2$($OH$)$_2NO_3$/$CaSiO_3$@g-$C_3N_4$ composite provoked a mesoporous structure.

0.05 g of sorbent was measured in a separate 150 ml beaker. 100 mL of the 100 milligram per liter (mgL$^{-1}$) basic fuchsin dye (BF) solution was poured into each beaker. A portion of the mixture was withdrawn till the BF sorption reached the equilibrium. The aliquots were filtered via a 0.22 μm syringe filter, and the absorbance was measured utilizing a UV-Vis-spectrophotometer (λ=550 nm). The contact time study of BF and sorption onto the as-prepared nanocomposite was studied. The BF and absorbance measured during the study were employed for calculating the remaining concentrations (unabsorbed) at each time interval via Eq. 1. Using Eq. 2 was utilized to calculate the adsorption capacity at each period [the BF or milligrams adsorbed onto one gram of sorbent, $q_t$, milligram per gram (mg·g$^{-1}$)].

$$C_t = \frac{\text{Absorbance}_{sample}}{\text{Absorbance}_{standard}} \times conc._{standard} \tag{1}$$

$$q_t = \frac{(C_0 - C_t)V}{m} \tag{2}$$

Figure 5:
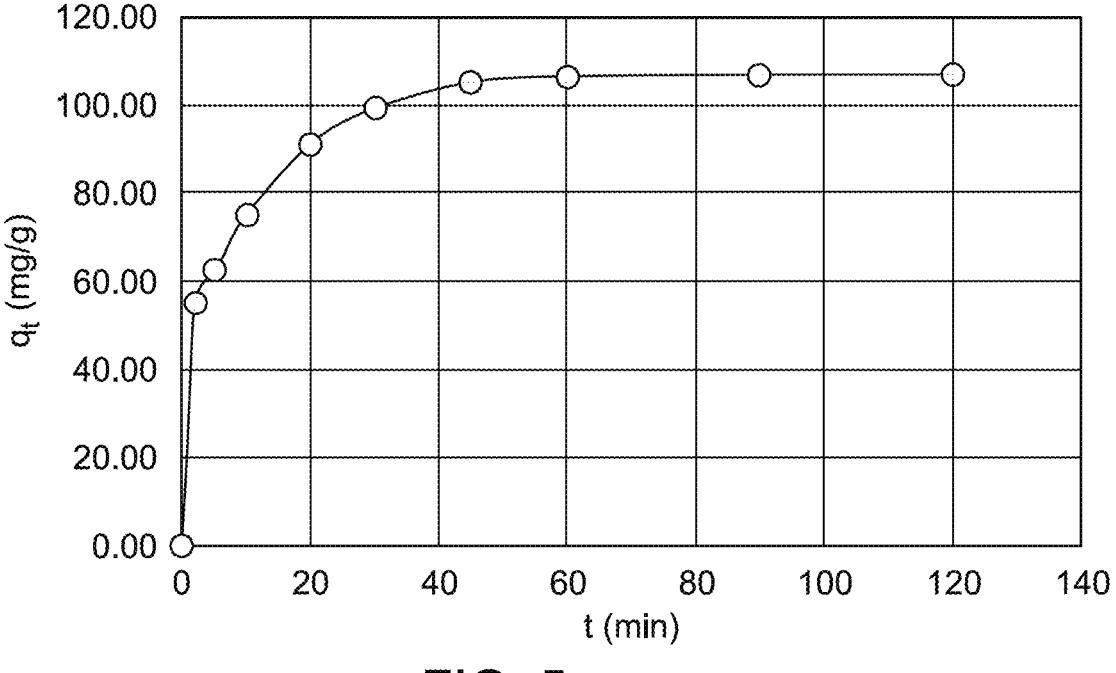
FIG. 5 depicts a contact time investigation of basic fuchsin dye (BF) adsorption onto $Cu_2(OH)_3NO_3$/$CaSiO_3@g-C_3N_4$ nanocomposite-based absorbent, according to certain embodiments.

FIG. 5 demonstrates the adsorption trend of BF onto prepared nanocomposite. The $Cu_2$($OH$)$_2NO_3$/$CaSiO_3$@g$C_3N_4$ showed $q_t$ values of 106.9 milligram per gram (mg/g); the results reflected the capability of the $Cu_2$($OH$)$_2NO_3$/$CaSiO_3$@g-$C_3N_4$ for treating water contaminated by organic pollutants. Notably, almost 90% of the gained $q_t$ value was acquired within the first 30 minutes, and the overall sorption processes reached equilibrium within 90 minutes, presenting the $Cu_2$($OH$)$_2NO_3$/$CaSiO_3$@g-$C_3N_4$ as fast treatment sorbent.

The adsorption rate order of BF removal by $Cu_2$($OH$)$_2NO_3$/$CaSiO_3$@g-$C_3N_4$ was studied via pseudo-first order (PF, Eq. 3) and pseudo-second order (PS, Eq. 4) kinetic models.

$$\ln(q_e - q_t) = \ln q_e - k_1 \cdot t \tag{3}$$

$$\frac{1}{q_t} = \frac{1}{k_2 \cdot q_e^2 t} + \frac{1}{q_e} \tag{4}$$

Figure 6:
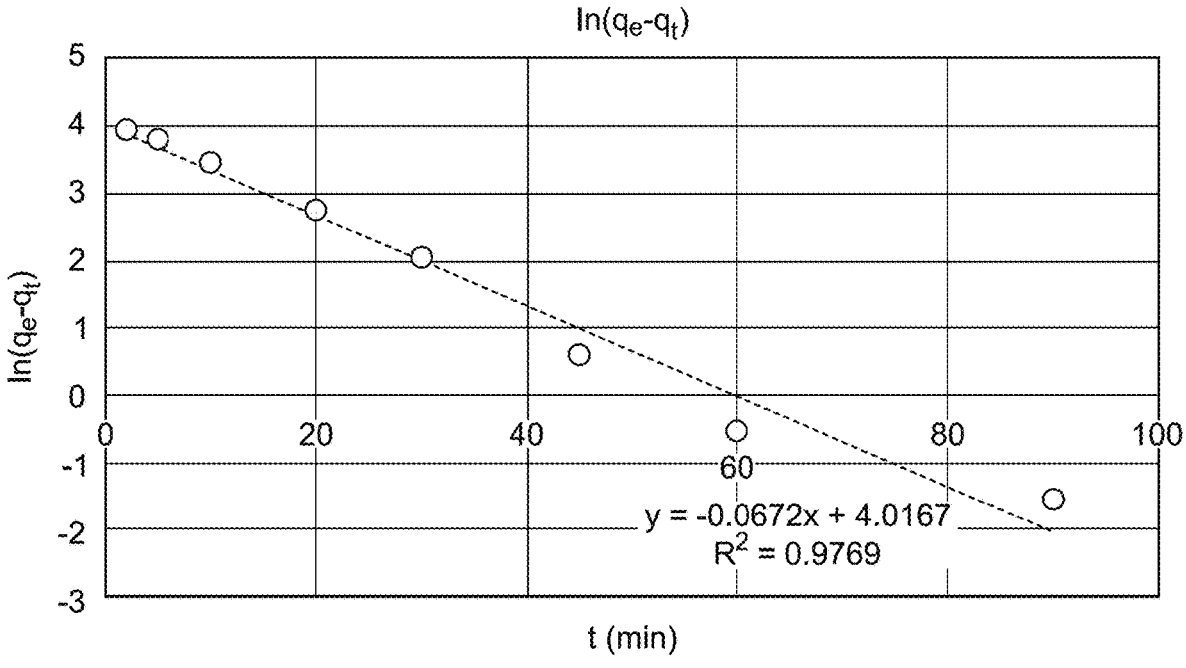
FIG. 6 depicts a pseudo-first order (PF) investigation of BF adsorption onto the $Cu_2(OH)_3NO_3$/$CaSiO_3@g-C_3N_4$ nanocomposite-based absorbent, according to certain embodiments.
Figure 7:
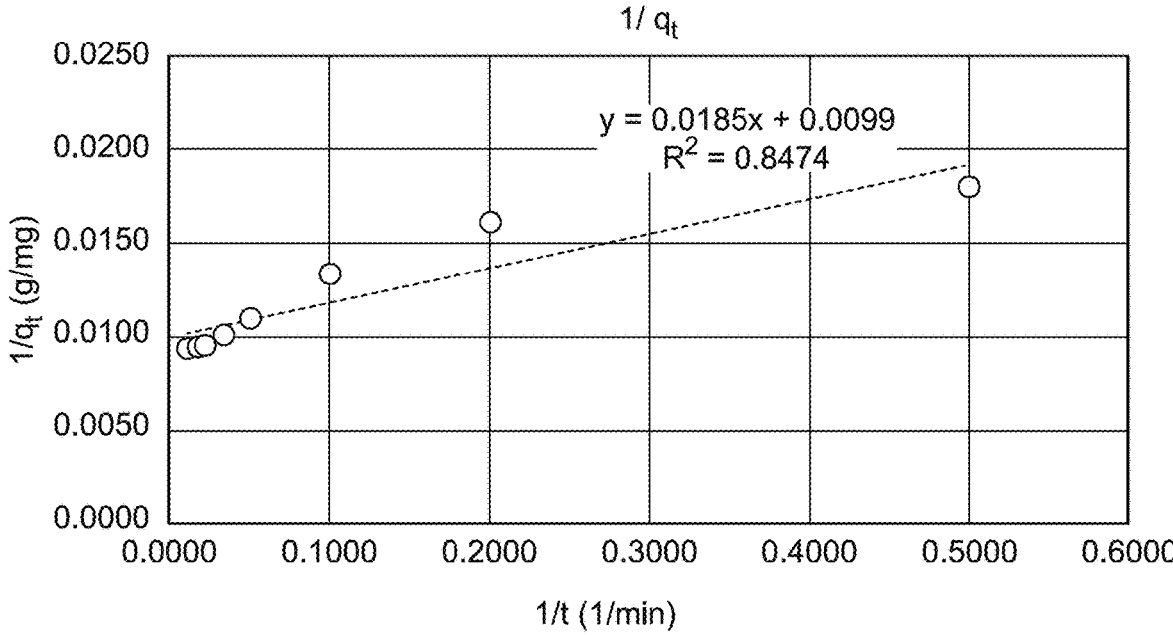
FIG. 7 depicts a pseudo-second order (PS) investigation of BF adsorption onto the $Cu_2(OH)_3NO_3$/$CaSiO_3@g-C_3N_4$ nanocomposite-based absorbent, according to certain embodiments.

The symbol $q_e$ (mg/g) represents the equilibrium adsorption capacity. The PF and PS constants are also time dependent, with the former represented as $k_1$ (min$^{-1}$) and the latter as $k_2$ [gram per milligram per minute (g mg$^{-1}$ min$^{-1}$)]. The PF plot of the BF adsorption onto $Cu_2$($OH$)$_2NO_3$/$CaSiO_3$@g-$C_3N_4$ nanocomposite is depicted in FIG. 6. Additionally, FIG. 7 illustrates the PS plots of BF sorption onto $Cu_2$($OH$)$_2NO_3$/$CaSiO_3$@g-$C_3N_4$. The rate-order output of BF removal illustrated that the sorption on $Cu_2$($OH$)$_2NO_3$/$CaSiO_3$@g-$C_3N_4$ showed better fitting to the PF model.

The rate-control mechanism of BF removal by $Cu_2$($OH$)$_2NO_3$/$CaSiO_3$@g-$C_3N_4$ was studied using the intraparticle (IPD, Eq. 5) and the liquid-film (LFD, Eq. 6) diffusion model.

$$q_t = K_{IP} * t^{\frac{1}{2}} + C_i \tag{5}$$

$$\ln(1 - F) = -K_{LF} * t \tag{6}$$

Figure 8:
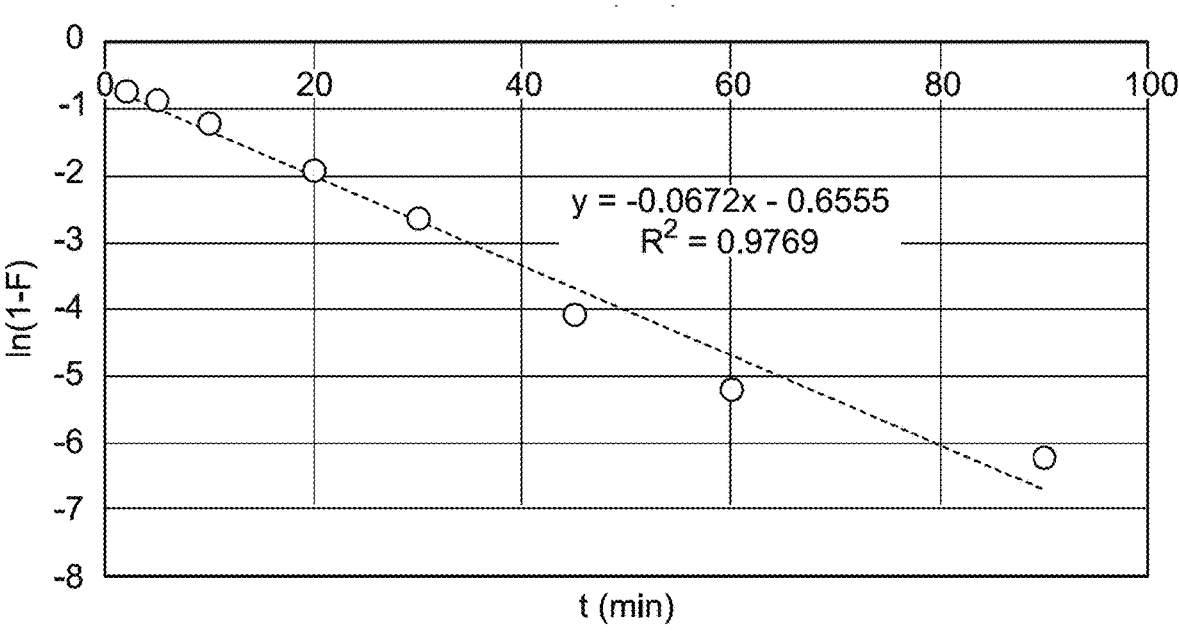
FIG. 8 depicts a liquid film (LFD) investigation of BF adsorption onto the $Cu_2(OH)_3NO_3$/$CaSiO_3@g-C_3N_4$ nanocomposite-based absorbent, according to certain embodiments.
Figure 9:
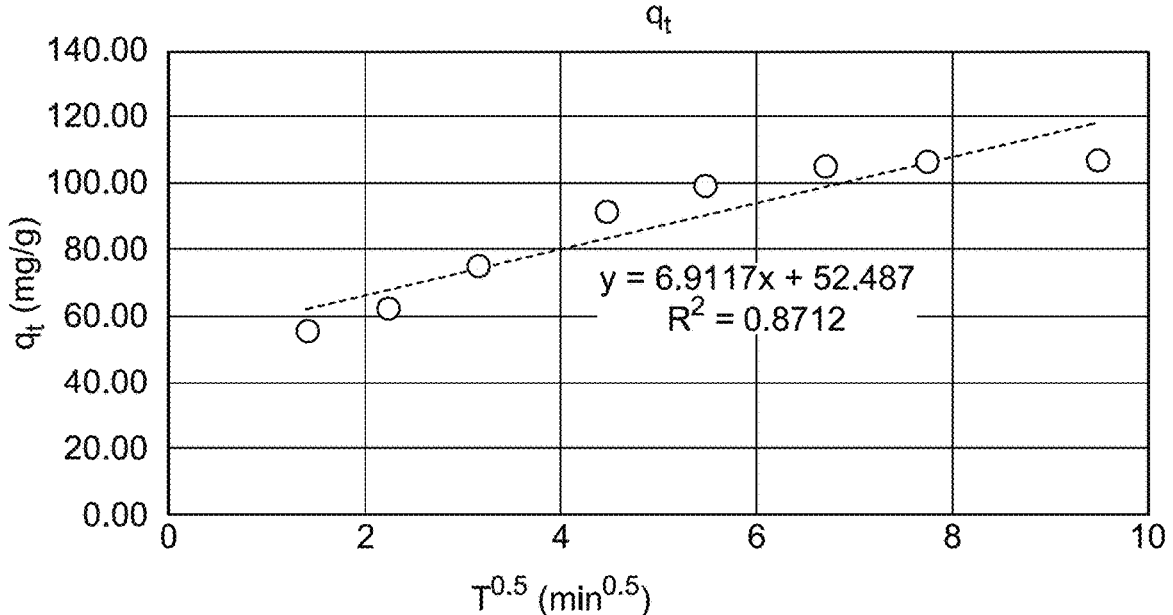
FIG. 9 depicts intraparticle (IPD) investigation of BF adsorption onto the $Cu_2(OH)_3NO_3$/$CaSiO_3@g-C_3N_4$ nanocomposite-based absorbent, according to certain embodiments.

The IPD constant is denoted by $K_{IPD}$ [milligrams per gram per square root of minute (mg g$^{-1}$ min$^{-1/2}$)], and the LFD constant is designated by $K_{LFD}$ (min$^{-1}$). $C_i$: the boundary layer factor, expressed as mg g$^{-1}$ The LFD plot of the BF adsorption onto $Cu_2$($OH$)$_2NO_3$/$CaSiO_3$@g-$C_3N_4$ nanocomposite was depicted in FIG. 8. Additionally, FIG. 9 illustrated the IPD plots of BF sorption onto $Cu_2$($OH$)$_2NO_3$/$CaSiO_3$@g-$C_3N_4$. The rate-control output of BF removal illustrated that the sorption of BF on the fabricated $Cu_2$($OH$)$_2NO_3$/$CaSiO_3$@g-$C_3N_4$ nanocomposite was mostly controlled by the LF model.

Numerous modifications and variations of the present disclosure are possible in light of the above teachings. It is therefore to be understood that within the scope of the appended claims, the invention may be practiced otherwise than as specifically described herein.

The invention claimed is:

1. A method of absorbing one or more pollutants in wastewater, comprising:
   contacting a $Cu_2$($OH$)$_3NO_3$/$CaSiO_3$@g-$C_3N_4$ nanocomposite-based absorbent with a solution comprising the one or more pollutants; thereby
   absorbing the one or more pollutants on the $Cu_2$($OH$)$_3NO_3$/$CaSiO_3$@g-$C_3N_4$ nanocomposite-based absorbent.

2. The method of claim 1, wherein the $Cu_2$($OH$)$_3NO_3$/$CaSiO_3$@g-$C_3N_4$ nanocomposite-based absorbent comprises:
   a graphite-phase carbon nitride (g-$C_3N_4$) in an amount of 20 to 40 percent by weight (wt. %),
   a copper hydroxide nitrate ($Cu_2$($OH$)$_3NO_3$) in an amount of 20 to 40 wt. %, and
   a calcium silicate ($CaSiO_3$) in an amount of 20 to 40 wt. %, based on a total weight of the $Cu_2(OH)_3NO_3/CaSiO_3@g$-$C_3N_4$ nanocomposite-based absorbent.

3. The method of claim 1, wherein the one or more pollutants is an organic pollutant.

4. The method of claim 1, wherein an absorption rate of the one or more pollutants onto the $Cu_2(OH)_3NO_3/CaSiO_3@g$-$C_3N_4$ nanocomposite-based absorbent follows a pseudo-first order kinetic model.

5. The method of claim 1, wherein the $Cu_2(OH)_3NO_3/CaSiO_3@g$-$C_3N_4$ nanocomposite-based absorbent has an absorption capacity of 100 to 115 mg of the one or more pollutants per gram of the $Cu_2(OH)_3NO_3/CaSiO_3@g$-$C_3N_4$ nanocomposite-based absorbent.

6. The method of claim 1, wherein the contacting occurs for 40 to 50 minutes.

7. The method of claim 1, wherein the $Cu_2(OH)_3NO_3/CaSiO_3@g$-$C_3N_4$ nanocomposite-based absorbent is made by a process comprising:

fabricating a calcium silicate $CaSiO_3$;

fabricating a graphite-phase carbon nitride g-$C_3N_4$;

mixing the calcium silicate $CaSiO_3$, the graphite-phase carbon nitride g-$C_3N_4$, and a copper salt in ethylene glycol monomethyl ether to form a mixture;

microwaving the mixture to form the $Cu_2(OH)_3NO_3/CaSiO_3@g$-$C_3N_4$ nanocomposite-based absorbent.

8. The method of claim 7, wherein the fabricating of the calcium silicate $CaSiO_3$ is made by a process comprising:

sonicating a mixture of a calcium salt and a silicate salt in an aqueous alcohol solution to form a calcium silicate mixture, followed by heating the calcium silicate mixture to a temperature of 160 to 200° C. for 1 to 3 hours to form the calcium silicate $CaSiO_3$, wherein the calcium salt is selected from a group consisting of calcium nitrate, calcium chloride, calcium phosphate, calcium carbonate and calcium citrate, and wherein the silicate salt is selected from a group consisting of calcium silicate, sodium silicate, potassium silicate, zeolites and micas.

9. The method of claim 7, wherein the fabricating of the graphite-phase carbon nitride g-$C_3N_4$ comprises heating urea to a temperature of 550 to 650° C. for 30 to 60 minutes.

10. The method of claim 7, wherein the mixing comprises a copper salt selected from a group consisting of copper nitrate, copper chloride, copper sulfate, copper bromide and copper cyanide.

11. The method of claim 7, wherein the microwaving is performed at a temperature of 160 to 200° C. at a pressure of 4 to 6 bar for 30 to 90 minutes.

12. A $Cu_2(OH)_3NO_3/CaSiO_3@g$-$C_3N_4$ nanocomposite, comprising:

a plurality of metal oxides nanorods;

a plurality of g-$C_3N_4$ nanosheets, wherein the metal oxide nanorods comprises $Cu_2(OH)_3NO_3$ and $CaSiO_3$.

13. The $Cu_2(OH)_3NO_3/CaSiO_3@g$-$C_3N_4$ nanocomposite of claim 12, wherein the metal oxides nanorods have an average length of 1 to 3 μm.

14. The $Cu_2(OH)_3NO_3/CaSiO_3@g$-$C_3N_4$ nanocomposite of claim 12, wherein the metal oxides nanorods comprise nanowires having a length of 10 to 50 nm protruding perpendicularly to the nanorods.

15. The $Cu_2(OH)_3NO_3/CaSiO_3@g$-$C_3N_4$ nanocomposite of claim 12, wherein the metal oxides nanorods are dispersed on the g-$C_3N_4$ nanosheets with some aggregates.

16. The $Cu_2(OH)_3NO_3/CaSiO_3@g$-$C_3N_4$ nanocomposite of claim 12, having a mesoporous structure with a plurality of wide pores in the g-$C_3N_4$ nanosheets where the metal oxides nanorods deposit.

17. The $Cu_2(OH)_3NO_3/CaSiO_3@g$-$C_3N_4$ nanocomposite of claim 12, having an average pore diameter of 3 to 7 nm.

18. The $Cu_2(OH)_3NO_3/CaSiO_3@g$-$C_3N_4$ nanocomposite of claim 12, having a Brunauer-Emmett-Teller (BET) surface area of 140 to 160 $m^2 \cdot g^{-1}$.

19. The $Cu_2(OH)_3NO_3/CaSiO_3@g$-$C_3N_4$ nanocomposite of claim 12, having an average pore volume of 0.3 to 0.4 $cm^3 \cdot g^{-1}$.

\* \* \* \* \*